United States Patent
Fairy

(10) Patent No.: US 7,303,720 B2
(45) Date of Patent: Dec. 4, 2007

(54) MELT TRANSFER DEVICE FOR A STACK MOLDING APPARATUS

(75) Inventor: Fabrice Fairy, Georgetown (CA)

(73) Assignee: Mold-Masters Limited, Georgetown, Ontario (CA)

( * ) Notice: Subject to any disclaimer, the term of this patent is extended or adjusted under 35 U.S.C. 154(b) by 340 days.

(21) Appl. No.: 11/155,726

(22) Filed: Jun. 20, 2005

(65) Prior Publication Data

US 2005/0280186 A1    Dec. 22, 2005

Related U.S. Application Data

(60) Provisional application No. 60/580,391, filed on Jun. 18, 2004.

(51) Int. Cl.
*B29C 45/18* (2006.01)
(52) U.S. Cl. .................. 264/328.8; 425/564; 425/572
(58) Field of Classification Search ............... 425/564, 425/572; 264/328.8
See application file for complete search history.

(56) References Cited

U.S. PATENT DOCUMENTS

| | | | |
|---|---|---|---|
| 2,514,390 A | 7/1950 | Hagen | |
| 2,928,125 A | 3/1960 | Smucker et al. | |
| 3,146,282 A | 8/1964 | Ninneman | |
| 3,205,911 A | 9/1965 | Swick, Jr. | |
| 3,270,115 A | 8/1966 | Nouel | |
| 3,315,899 A | 4/1967 | Quarve | |
| 3,902,665 A | 9/1975 | Hendry | |
| 3,934,626 A | 1/1976 | Hall | |
| 4,010,903 A | 3/1977 | Sakuri et al. | |
| 4,212,626 A | 7/1980 | Gellert | |
| 4,674,968 A | 6/1987 | Durst | |
| 4,983,117 A | 1/1991 | von Buren et al. | |
| 5,011,646 A | 4/1991 | Bertschi | |
| 5,012,839 A | 5/1991 | Rogers et al. | |
| 5,229,145 A | 7/1993 | Brown et al. | |
| 5,458,843 A | 10/1995 | Brown et al. | |
| 5,460,510 A | 10/1995 | Gellert | |
| 5,464,579 A | 11/1995 | Brown et al. | |
| 5,720,433 A | 2/1998 | Forker | |
| 5,846,472 A | 12/1998 | Rozema et al. | |
| 5,968,562 A | 10/1999 | Schad et al. | |
| 5,975,127 A | 11/1999 | Dray | |
| 6,348,171 B1 | 2/2002 | Dewar et al. | |
| 6,454,558 B1 | 9/2002 | Gellert | |
| 6,575,731 B1 | 6/2003 | Olaru et al. | |
| 6,835,060 B2 | 12/2004 | Sicilia | |
| 7,122,145 B2 * | 10/2006 | Olaru et al. ................ | 425/564 |
| 2002/0121713 A1 | 9/2002 | Moss et al. | |

FOREIGN PATENT DOCUMENTS

| | | |
|---|---|---|
| JP | 5 185473 | 7/1993 |
| JP | 6 023806 | 2/1994 |
| JP | 2003 127186 | 5/2003 |
| WO | 2005046960 A1 | 5/2005 |

* cited by examiner

*Primary Examiner*—Tim Heitbrink
(74) *Attorney, Agent, or Firm*—Ridout & Maybee LLP

(57) ABSTRACT

A melt transfer device for an injection molding apparatus includes a first shut off valve coupled to a first nozzle having a first melt channel. The first melt channel delivers a melt stream of moldable material to a second melt channel of a second nozzle, which is movable relative to the first nozzle. A second shut off valve is coupled to the second nozzle. The first shut off valve and the second shut off valve are retractable to open a melt transfer channel of the melt transfer device to allow melt to flow between the first melt channel and the second melt channel.

20 Claims, 15 Drawing Sheets

MELT TRANSFER DEVICE FOR A STACK MOLDING APPARATUS

FIELD OF THE INVENTION

The present invention relates generally to a stack injection molding apparatus and, in particular to a melt transfer device therefor.

BACKGROUND OF THE INVENTION

Stack molding provides an advantage over single molding in that it enables the output of an injection molding machine to be at least doubled without significantly increasing its size. Stack mold configurations generally employ a stationary first platen, a movable center platen and a movable second platen. The mold cavities are conventionally located on opposing faces of the movable center platen. The movable center platen and the second movable platen reciprocate to open and close the mold cavities during a production cycle. In a stack molding apparatus, the melt runner system or the manifold system extends through the center platen in order to reach the mold cavities located on each side of the center platen via an equal path length.

Typically, multi-cavity stack molds use a pair of melt transfer nozzles to provide a direct melt channel between the extruder nozzle of the injection molding machine and its hot runner distributor, or manifold, which is mounted in the center platen of the stack mold. The manifold delivers melt to injection nozzles that are associated with the mold cavities.

As a result of the reciprocating action of the movable platens, the melt transfer nozzles are continuously coupled to, and decoupled from, one another. This often causes drooling and/or stringing of the melt to occur, which is undesirable.

A need therefore exists for a melt transfer device that controls the flow of the pressurized melt stream such that when the melt transfer nozzles are decoupled from one another the occurrence of drooling and/or stringing is reduced.

SUMMARY OF THE INVENTION

According to an embodiment of the present invention a melt transfer device includes a first shut off valve and a second shut off valve. The first shut off valve includes a first melt channel, a stationary sleeve and a movable pin located within the stationary sleeve. The movable pin is configured to slidably contact the stationary sleeve over a portion of the travel of the movable pin to fluidly close an end of the first melt channel. The second shut off valve includes a second melt channel, a movable sleeve and a stationary pin located within the movable sleeve. The movable sleeve is configured to slidably contact the stationary pin over a portion of the travel of the movable sleeve to fluidly close an end of the second melt channel. The first shut off valve is configured to engage the second shut off valve such that the stationary sleeve presses the movable sleeve, and the stationary pin presses the movable pin, thereby fluidly coupling the first melt channel to the second melt channel.

According to another embodiment of the present invention a melt transfer device includes a first shut off valve and a second shut off valve. The first shut off valve includes a first stationary portion and a first movable portion. The first shut off valve is in a closed position when the first movable portion is extended such that it slidably contacts the first stationary portion thereby closing an end of the first melt channel. The second shut off valve includes a second stationary portion and a second movable portion, wherein the second shut off valve is in a closed position when the second movable portion is extended such that it slidably contacts the second stationary portion thereby closing an end of the second melt channel. The first shut off valve is configured to engage the second shut off valve such that the first stationary portion retracts the second movable portion and the second stationary portion retracts the first movable portion such that the first shut off valve is in an open position and the second shut off valve is in an open position wherein the first melt channel and the second melt channel are in fluid communication. A portion of a first melt channel is defined between a surface of the first stationary portion and a surface of the first movable portion and a portion of a second melt channel is defined between a surface of the second stationary portion and a surface of the second movable portion when the first shut off valve is in an open position and the second shut off valve is in an open position.

According to another embodiment of the present invention a stack molding apparatus includes a stationary platen, a first movable platen, a second movable platen and a melt transfer device. The stationary platen includes a first melt channel in fluid communication with a source of molten material. The first movable platen includes a second melt channel fluidly coupled to a manifold that is in fluid communication with a plurality of mold cavities. A first portion of the plurality of mold cavities is defined between the stationary platen and the first movable platen and a second portion of the plurality of mold cavities is defined between the first movable platen and the second movable platen. The melt transfer device includes a first shut off valve that is in fluid communication with the first melt channel and a second shut off valve that is in fluid communication with the second melt channel. The first shut off valve includes a stationary sleeve and a movable first pin and the movable pin slidably contacts the stationary sleeve to close an end of the first melt channel when the first shut off valve is in a closed position. The movable first pin is separated from the stationary sleeve by a gap when the first shut off valve is in an open position. The second shut off valve includes a movable sleeve and a second pin and the movable sleeve slidably contacts the second pin to close an end of the second melt channel when the second shut off valve is in a closed position. The movable sleeve is separated from the second pin when the second shut off valve is in an open position. The first shut off valve and the second shut off valve are configured such that they abut immediately adjacent to the respective closed ends of the first and second melt channels and are opened by movement of the first movable platen toward the stationary platen.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
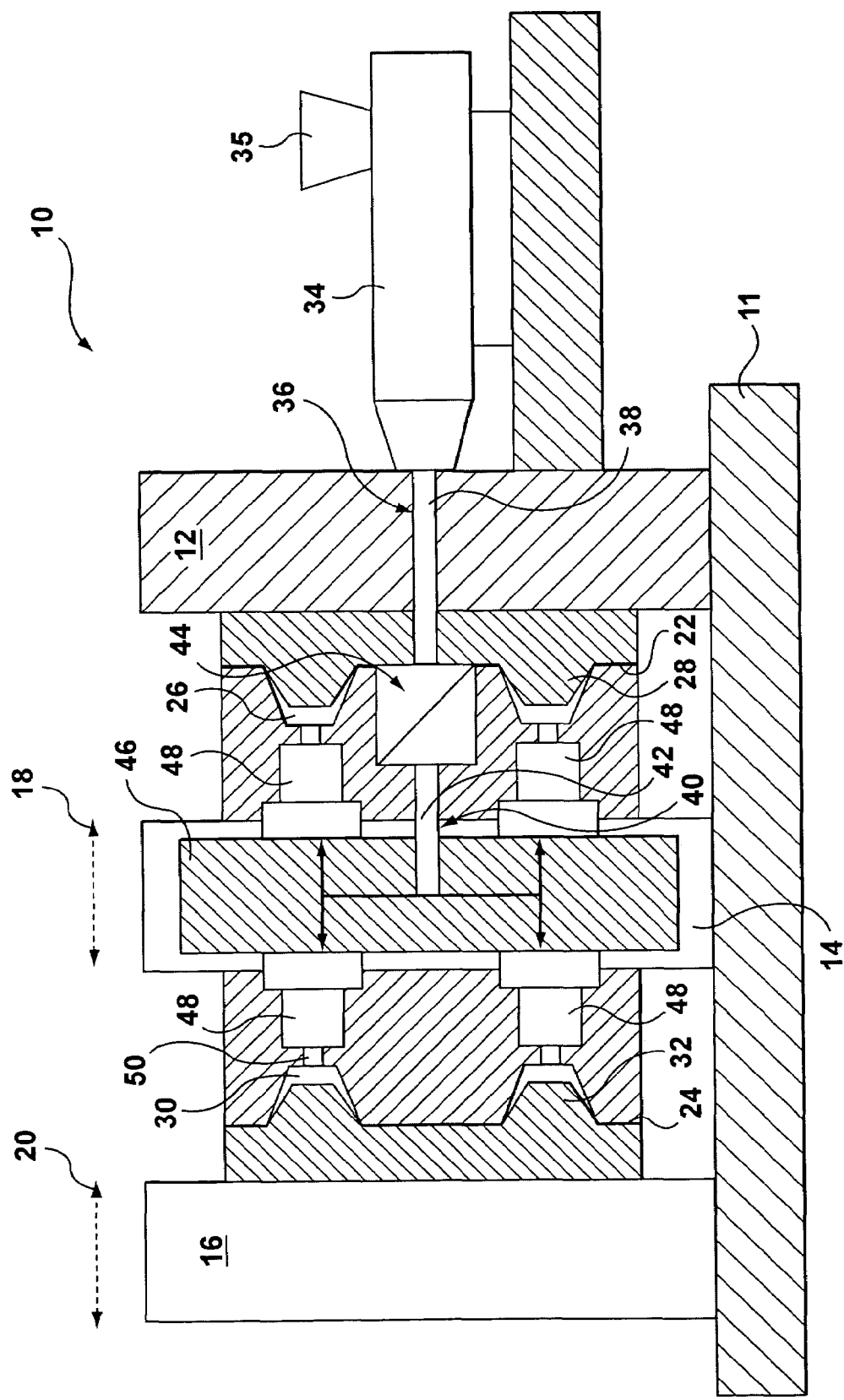
FIGS. 1 and 2 are schematic side views of a stack injection molding apparatus according to an embodiment of the present invention.
Figure 2:
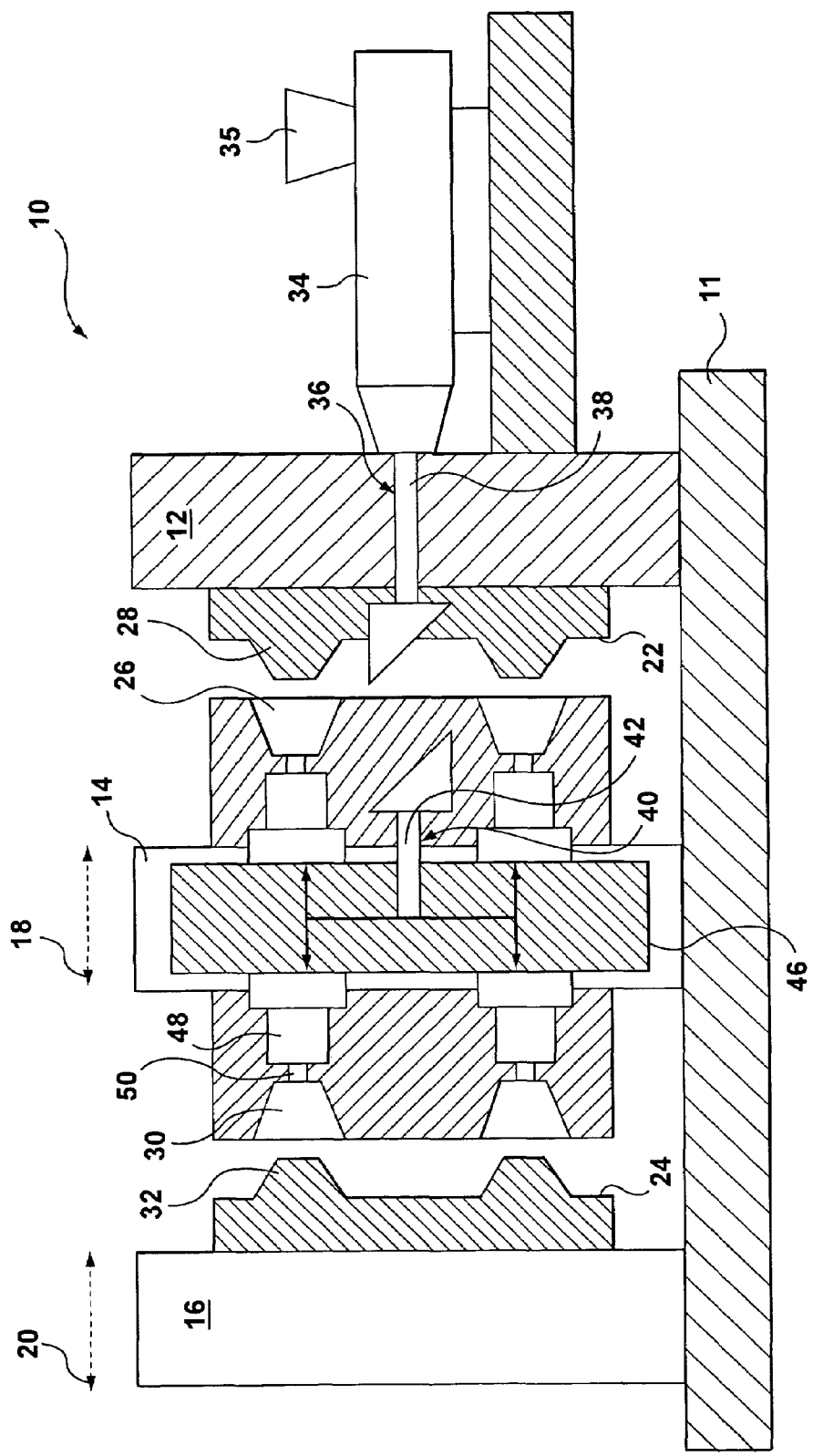
Figure 3:
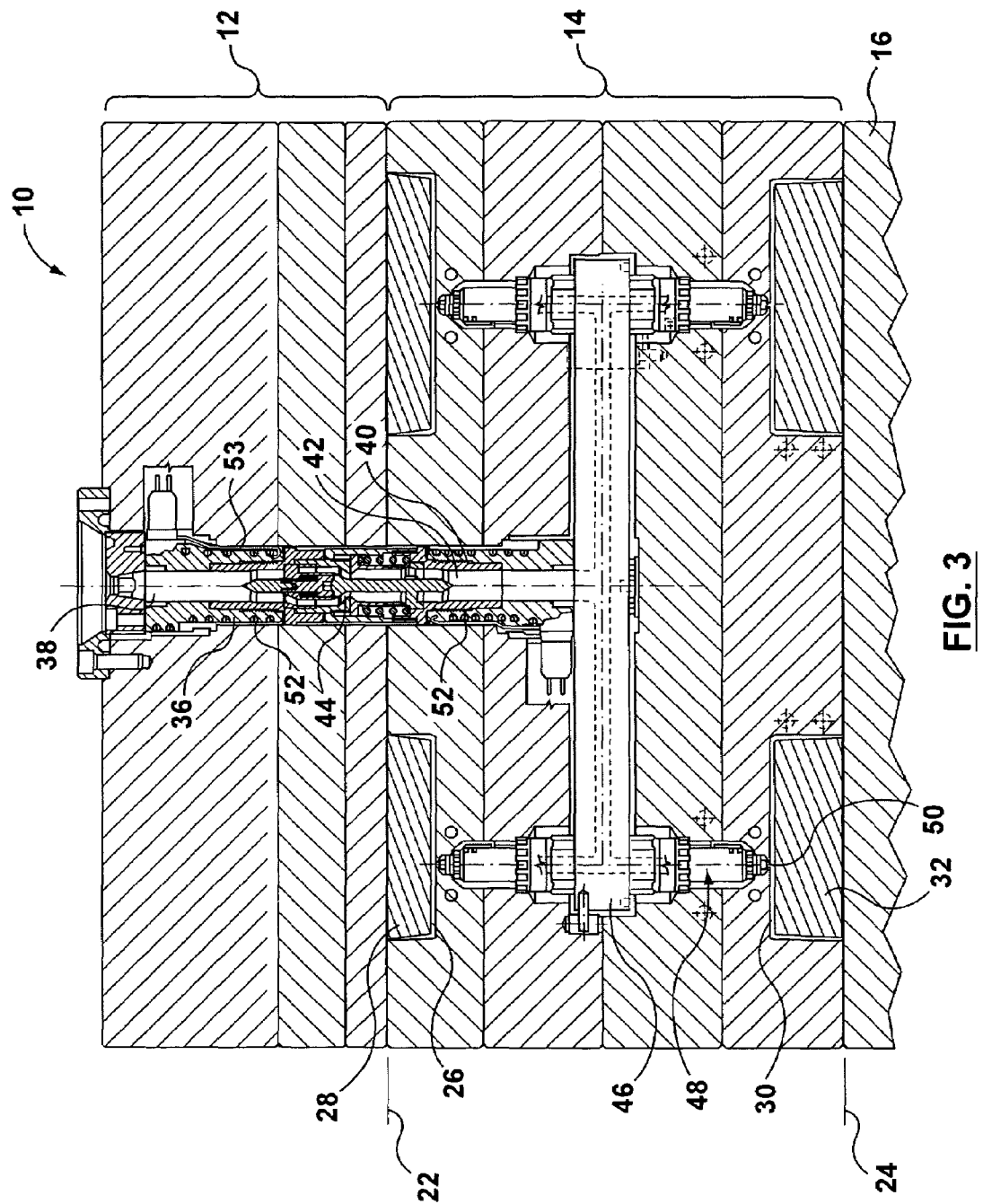
FIG. 3 is a side view partly in section of the stack injection molding apparatus of FIGS. 1 and 2.

Referring now to FIGS. 1, 2 and 3, a stack injection molding apparatus is generally indicated by reference numeral 10. The apparatus 10 includes a base 11, a stationary first mold platen 12, a movable center mold platen 14 and a movable second mold platen 16. The movable center mold platen 14 and movable second mold platen 16 are movable relative to the stationary first mold platen 12, as indicated by arrows 18 and 20, respectively, by a positioning mechanism (not shown). The movable center mold platen 14 and the movable second mold platen 16 split the stack injection molding apparatus 10 at parting lines 22 and 24, respectively. A first series of mold cavities 26 is located between the movable center platen 14 and a first series of mold cores 28, which project from the stationary first mold platen 12. Similarly, a second series of mold cavities 30 is located between the movable center mold platen 14 and a second series of mold cores 32, which project from the movable second platen 16.

A machine nozzle 34, which receives moldable material from a hopper 35, delivers a melt stream of moldable material to a first melt channel 38 of a first melt transfer nozzle 36. A second melt transfer nozzle 40 is selectively coupled to the first melt transfer nozzle 36 through a melt transfer device, which is generally indicated by reference numeral 44. The second melt transfer nozzle 40 includes a second melt channel 42 for receiving melt from the first melt channel 38 when the melt transfer device 44 is engaged and in an open position.

A manifold 46 is coupled to the second melt channel 42 to receive melt therefrom and distribute the melt to a series of nozzles 48. The melt stream flows through the nozzles 48, past mold gates 50 and into the mold cavities 26 and 30. The first and second melt transfer nozzles 36 and 40 are provided with heaters 52 and thermocouple 53 for maintaining the melt at a predetermined temperature during injection.

During operation of the stack injection molding apparatus 10 of FIGS. 1-3, the first melt transfer nozzle 36 receives a melt stream of moldable material from the machine nozzle 34 and delivers the melt stream under pressure through the melt transfer device 44 to the second melt transfer nozzle 40.

From the second melt transfer nozzle 40, the melt flows into a manifold 46, which distributes the melt to a series of nozzles 48. The melt stream flows through the nozzles 48, past mold gates 50 and into mold cavities 26 and 30, where the melt cools to produce molded parts (not shown). Once the molded parts have been produced, the movable center mold platen 14 and the movable second mold platen 16 separate from the stationary first mold platen 12, at parting lines 22 and 24, respectively, as shown in FIG. 2, to allow for ejection of the molded parts.

Figure 5:
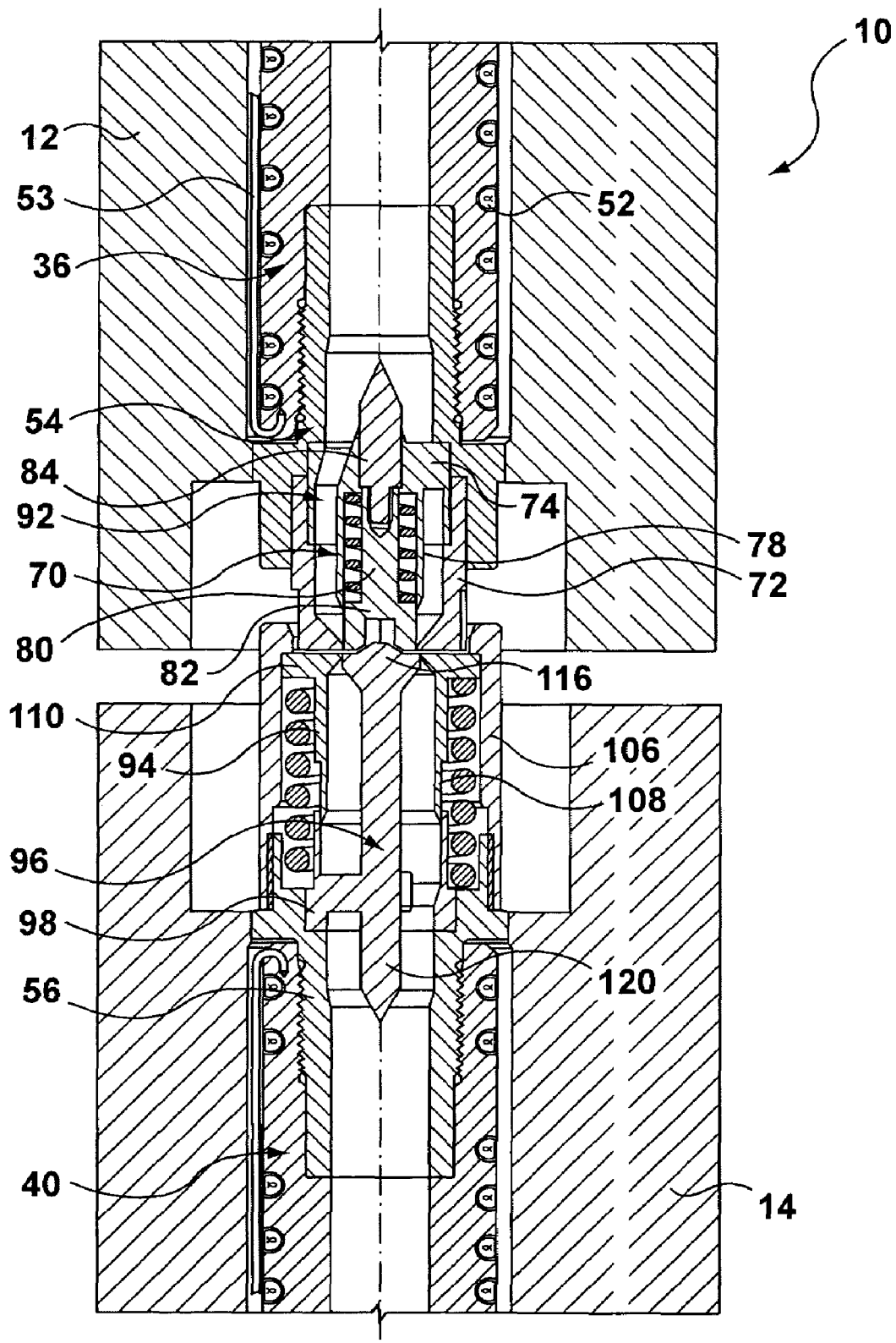
FIG. 5 is a view similar to FIG. 4 showing the melt transfer device in a closed position.
Figure 6:
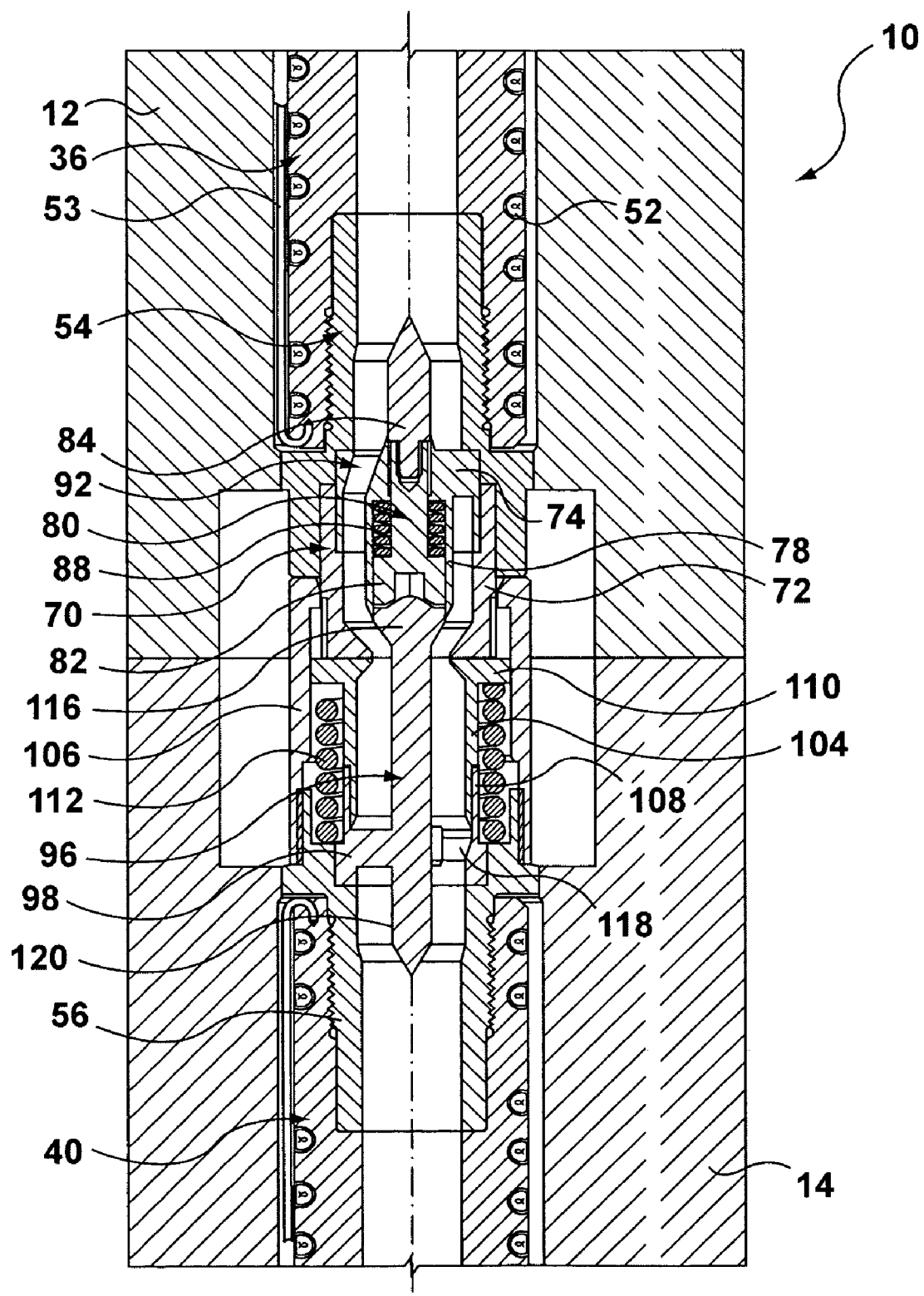
FIG. 6 is a view similar to FIG. 4 showing the melt transfer device in an engaged and open position.
Figure 7:
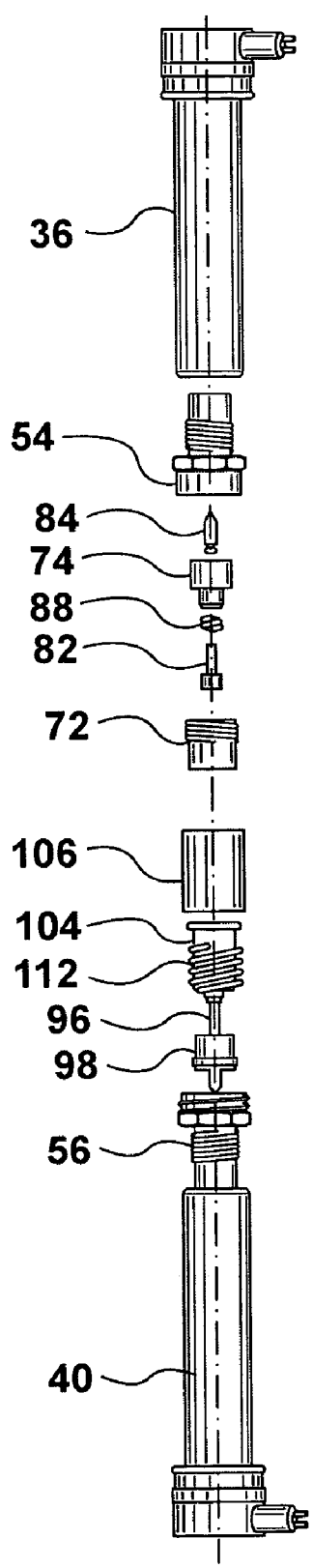
FIG. 7 is an exploded isometric view of melt transfer nozzles and the melt transfer device of FIGS. 3-6.

FIGS. 4-7 show a melt transfer device 44 and FIG. 7, in particular, is an exploded view of melt transfer device 44. Melt transfer device 44 generally includes a first link 54, which is coupled to the first melt transfer nozzle 36, and a second link 56, which is coupled to the second melt transfer nozzle 40. Each of links 54 and 56 includes a threaded outer wall 58 and 60, respectively, for engaging a threaded inner wall 62 and 64 of recesses 66 and 68 that are provided in the first and second melt transfer nozzles 36 and 40, respectively.

A movable pin assembly 70, or first shut off valve, is surrounded by a stationary sleeve 72, which is received in the first link 54 and coupled thereto by a threaded connection. The stationary sleeve 72 may alternatively be coupled to the first link 54 by other suitable means, such as brazing, for example. The movable pin assembly 70 includes a base 74, which is received in a seat 76 of the first link 54, a pin-receiving portion 78 and a pin 80. The pin 80 reciprocates within the pin-receiving portion 78 and includes a head portion 82 that is threadably coupled to a tip 84. A tool-receiving aperture 86 is provided in the head portion 82 for coupling and decoupling the head portion 82 is biased and the tip 84 during assembly or disassembly. Pin 80 is spring-loaded by a spring 88 provided in the pin-receiving portion 78 such that the head portion 82 toward a closed position in which the head portion 82 engages an aperture 90 that is provided in the stationary sleeve 72. A channel 92 extends through the base 74 of the movable pin assembly 70 to allow melt to flow there through.

Figure 4:
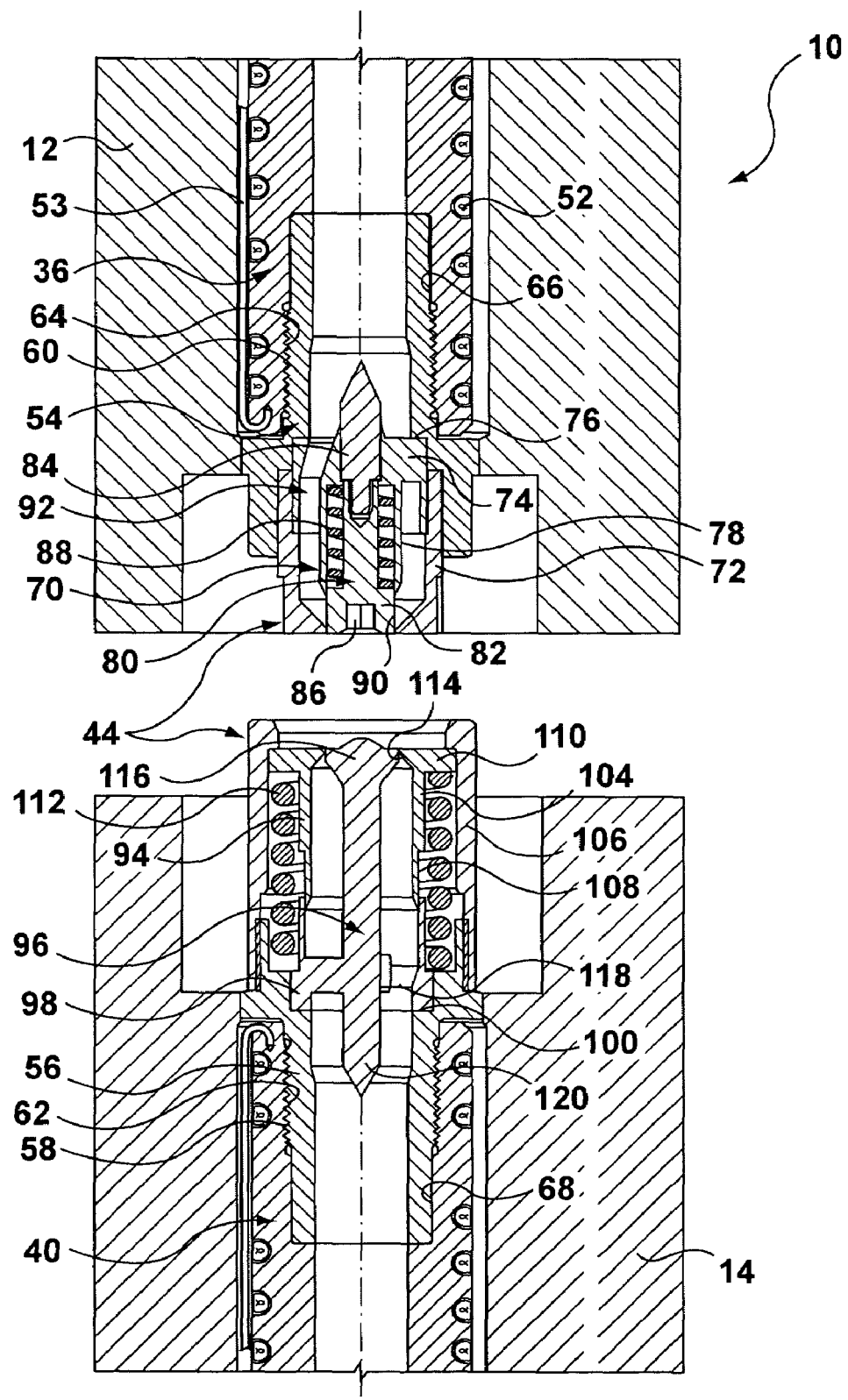
FIG. 4 is an expanded view of a portion of the stack molding apparatus of FIG. 3 showing a melt transfer device in a disengaged position.

In the closed position, which is shown in FIGS. 4 and 5, melt cannot flow through aperture 90 of stationary sleeve 72. Therefore, substantially no drooling of melt from the melt transfer device 44 occurs. When melt transfer device 44 is in the open position, as shown in FIG. 6, head portion 82 is clear of aperture 90 to allow melt to flow there through.

A movable sleeve assembly 94, or second shut off valve, surrounds a stationary pin member 96 having a base 98, which is received in a seat 100 provided in second link 56. The movable sleeve assembly 94 includes a movable sleeve 104 that reciprocates within an outer collar 106. The outer collar 106 is coupled to the second link 56 by a threaded connection. The movable sleeve 104 includes a tapered portion 108 and an outwardly extending flange 110, which is provided at an opposite end thereof. Tapered portion 108 is sized to telescope within base 98 of the stationary pin member 96. A spring 112 is provided between outer collar 106 and movable sleeve 104 to bias movable sleeve 104 toward a position in which an aperture 114 of movable sleeve 104 engages a mating head 116 of stationary pin member 96. A channel 118 extends through base 98 of stationary pin member 96 to allow melt to flow there through. A tool-receiving aperture (not shown) may be provided in mating head 116 similar to tool-receiving aperture 86 of head portion 82.

In the closed position, as shown in FIGS. 4 and 5, melt cannot flow through aperture 114 of movable sleeve 104.

Therefore, substantially no drooling of melt from melt transfer device 44 occurs. When melt transfer device 44 is in the open position, as shown in FIG. 6, aperture 114 is clear of mating head 116 of stationary pin member 96 to allow melt to flow there through.

Tip 84 of movable pin assembly 70 and a stationary tip 120 of stationary pin member 96 may be provided to form a smooth flowing surface over movable pin assembly 70 and stationary pin member 96.

The stages of operation of the melt transfer device 44 are shown in FIGS. 4-6. Prior to the start of an injection cycle, movable center mold platen 14 is separated from stationary first mold platen 12 and melt transfer device 44 is disengaged, as shown in FIG. 4. In this position, springs 88 and 112 bias movable pin assembly 70 and movable sleeve assembly 94, respectively, toward a closed position. In the closed position, melt flow from first melt transfer nozzle 36 is blocked by sliding engagement of head portion 82 of movable pin assembly 70 with aperture 90 of stationary sleeve 72 located at the end of first melt channel 38 and melt flow from second melt transfer nozzle 40 is blocked by sliding engagement of mating head 116 of stationary pin member 96 with aperture 114 of movable sleeve 104 located at the end of second melt channel 42.

To initiate the injection cycle, movable center mold platen 14 moves toward stationary first mold platen 12 until melt transfer device is in the position shown in FIG. 5. In this position, head portion 82 of movable pin assembly 70 and mating head 116 of stationary pin member 96 abut one another at a pin interface and stationary sleeve 72 and movable sleeve 104 abut one another at a sleeve interface. The pin interface and sleeve interface may or may not be coplanar. From this position, movement of movable center platen 14 toward stationary first mold platen 12 continues until mold platens 12 and 14 abut one another. As shown in FIG. 6, the stationary pin member 96 forces pin 80 of movable pin assembly 70 to retract and stationary sleeve 72 forces movable sleeve 104 to retract. The simultaneous retraction of both pin 80 and movable sleeve 104 clears apertures 90 and 114 to allow melt to flow between first melt transfer nozzle 36 and second melt transfer nozzle 40 through an annular interface between the first and second melt channels. With melt transfer device 44 in the open position, melt flows from machine nozzle 34, through melt transfer nozzle 36, melt transfer device 44, melt transfer nozzle 40 and into manifold 46 where the melt is distributed to nozzles 48, which deliver melt to mold cavities 26 and 30.

When the injection cycle is complete and the molded parts in mold cavities 26 and 30 have been cooled, movable center mold platen 14 moves away from stationary first mold platen 12. Movable pin assembly 70 and movable sleeve assembly 94 of melt transfer device 44 are biased toward the closed position. As such, melt flow between first melt transfer nozzle 36 and second melt transfer nozzle 40 is blocked prior to disengagement of melt transfer device 44 in order to reduce the occurrence of drooling and/or stringing.

Figure 8:
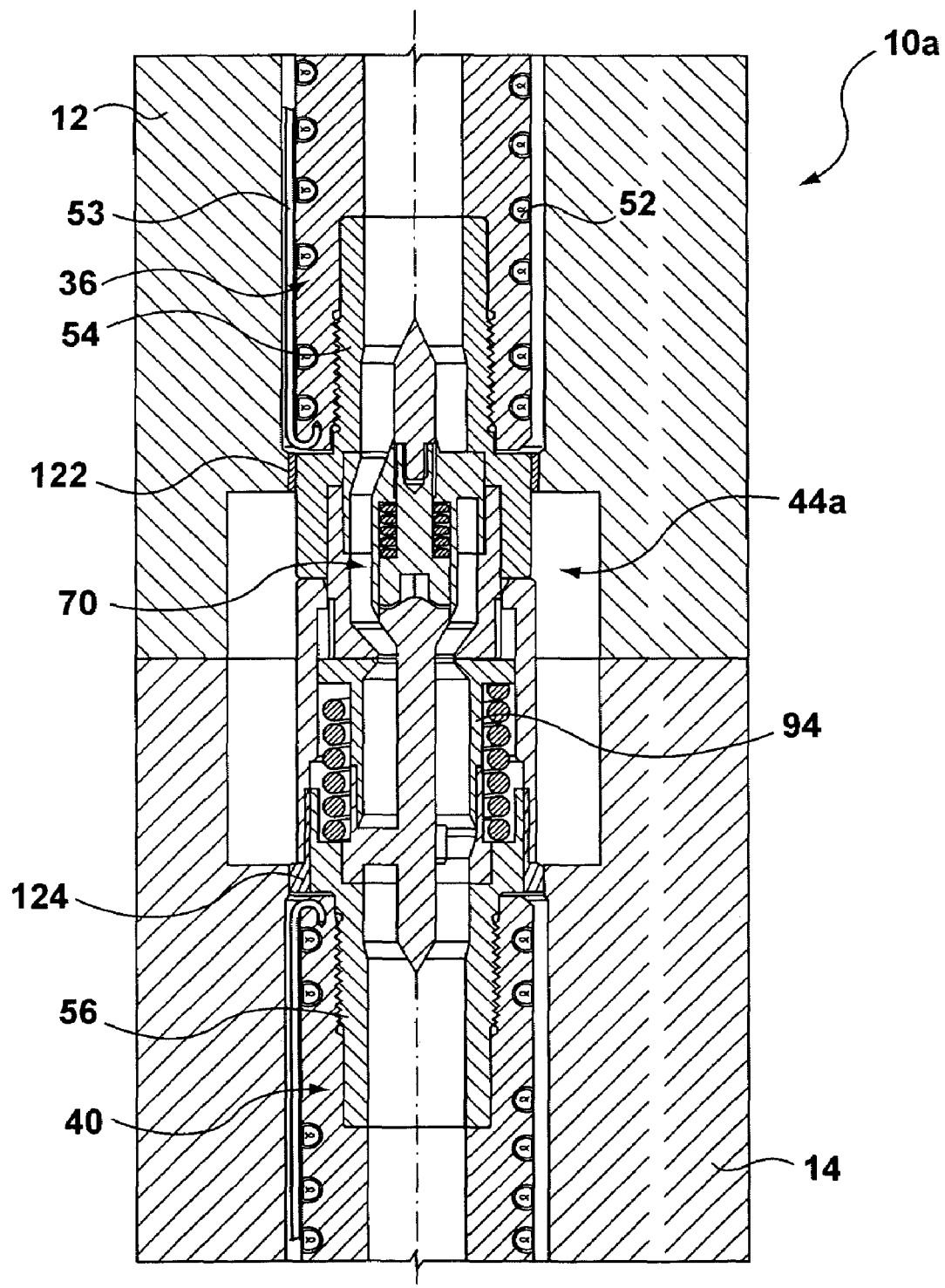
FIG. 8 is a side cross-sectional view of a portion of a stack injection molding apparatus according to another embodiment of the present invention.

FIG. 8 shows a portion of another embodiment of a stack injection molding apparatus 10a including melt transfer device 44a. Melt transfer device 44a functions similar to the embodiment described above. However, melt transfer device 44a includes first and second insulation rings 122 and 124. First insulation ring 122 is provided between stationary first mold platen 12 and first link 54 and second insulation ring 124 is provided between movable center mold platen 14 and second link 56. Insulation rings 122 and 124 insulate first link 54 and second link 56 from the cold mold platens 12 and 14, respectively. Any suitable material and configuration may be used for the insulation rings 122, 124. For example, a titanium or ceramic ring may be used.

Figure 9:
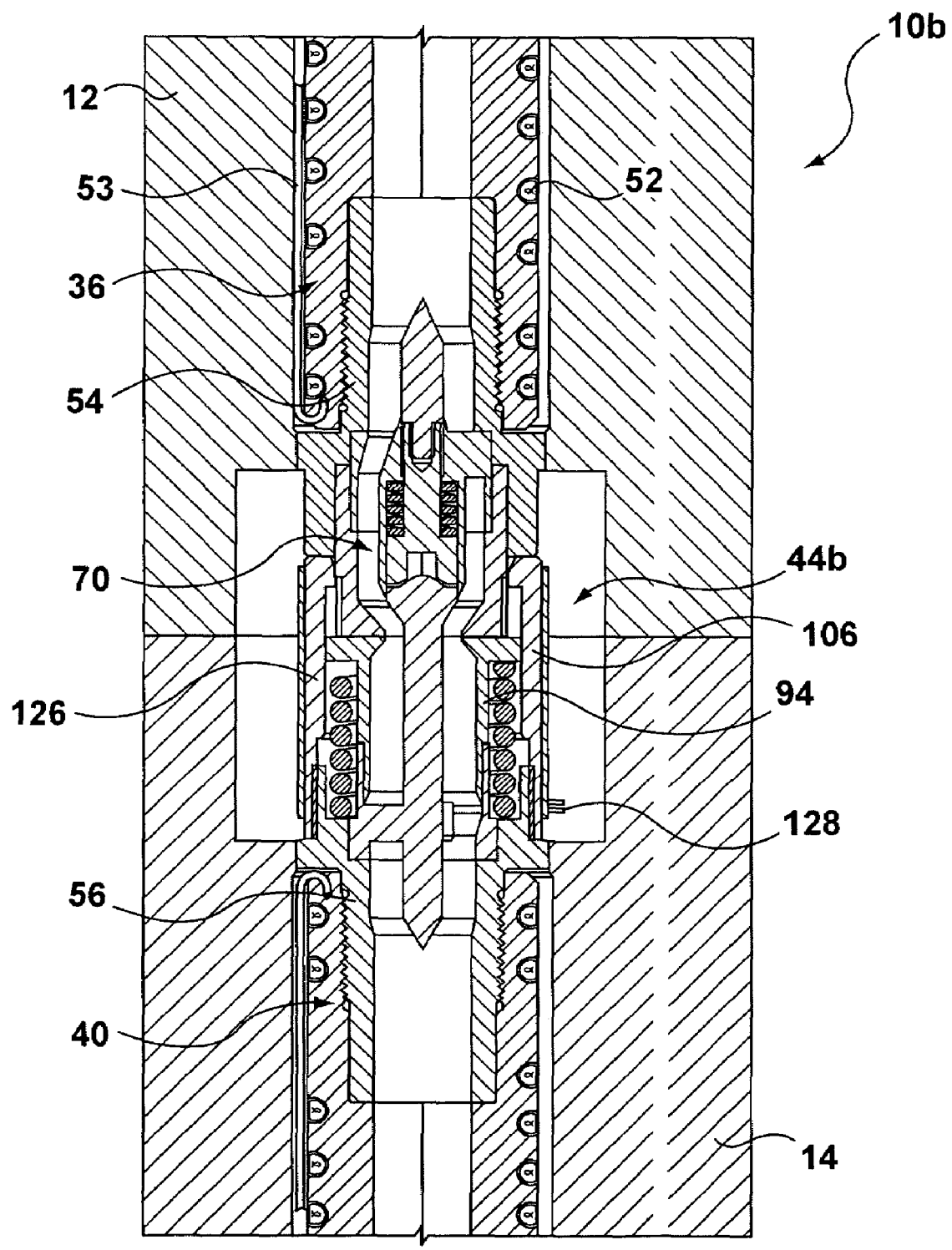
FIG. 9 is a side cross-sectional view of a portion of a stack injection molding apparatus according to yet another embodiment of the present invention.

Referring to FIG. 9, a portion of another embodiment of a stack injection molding apparatus 10b is shown, including melt transfer device 44b. Melt transfer device 44b functions similar to the embodiments described above, however, melt transfer device 44b includes a heater 126 surrounding stationary sleeve 106. Heater 126 is powered through electrical connector 128 and may be any suitable type known in the art. For example, heater 126 may be a resistive strip heater, heater wire, a heater sleeve or an embedded heater coil.

Figure 10:
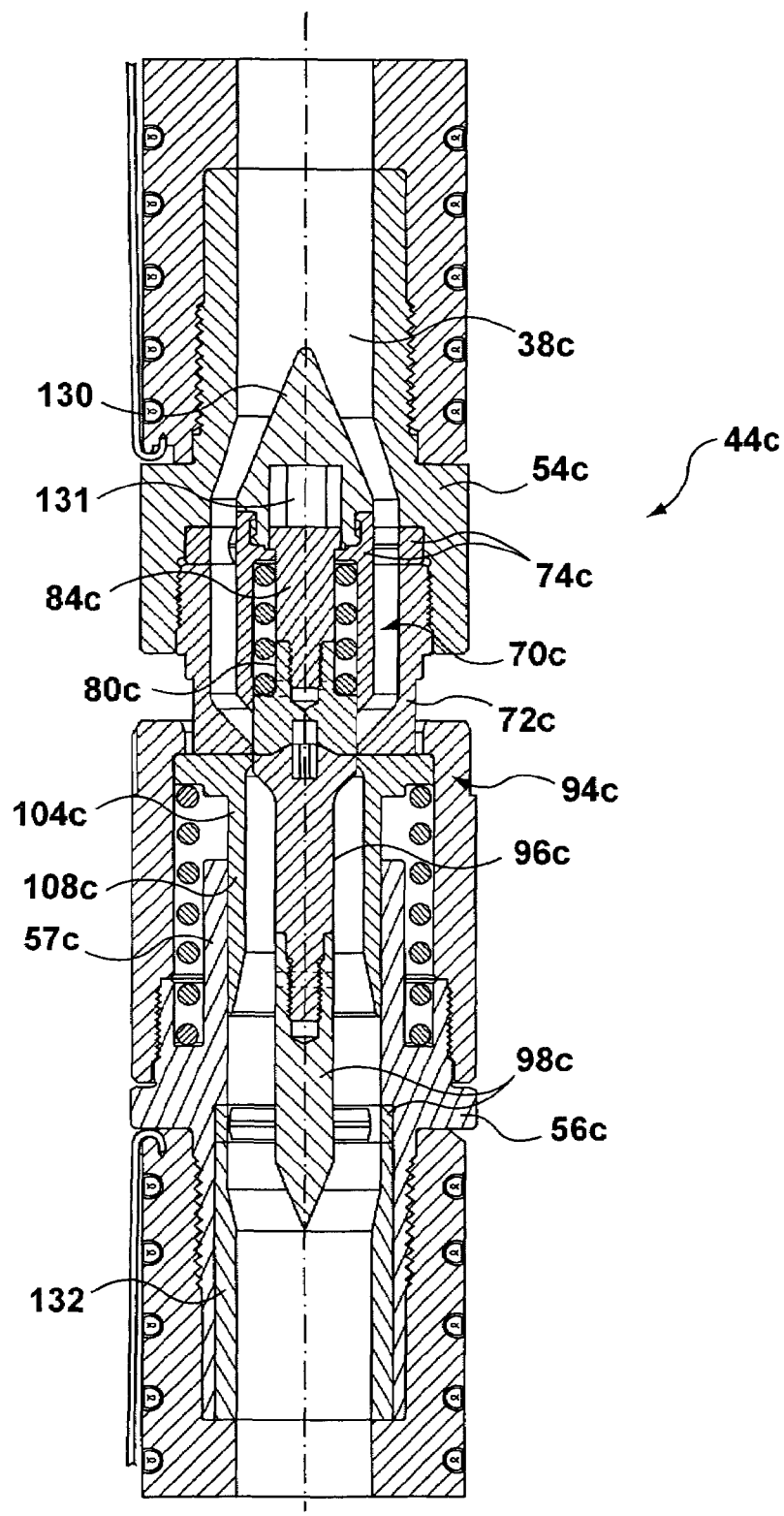
FIGS. 10 and 11 are side cross-sectional views of another embodiment of the melt transfer device according to the present invention in a closed position and in an engaged and open position, respectively.
Figure 11:
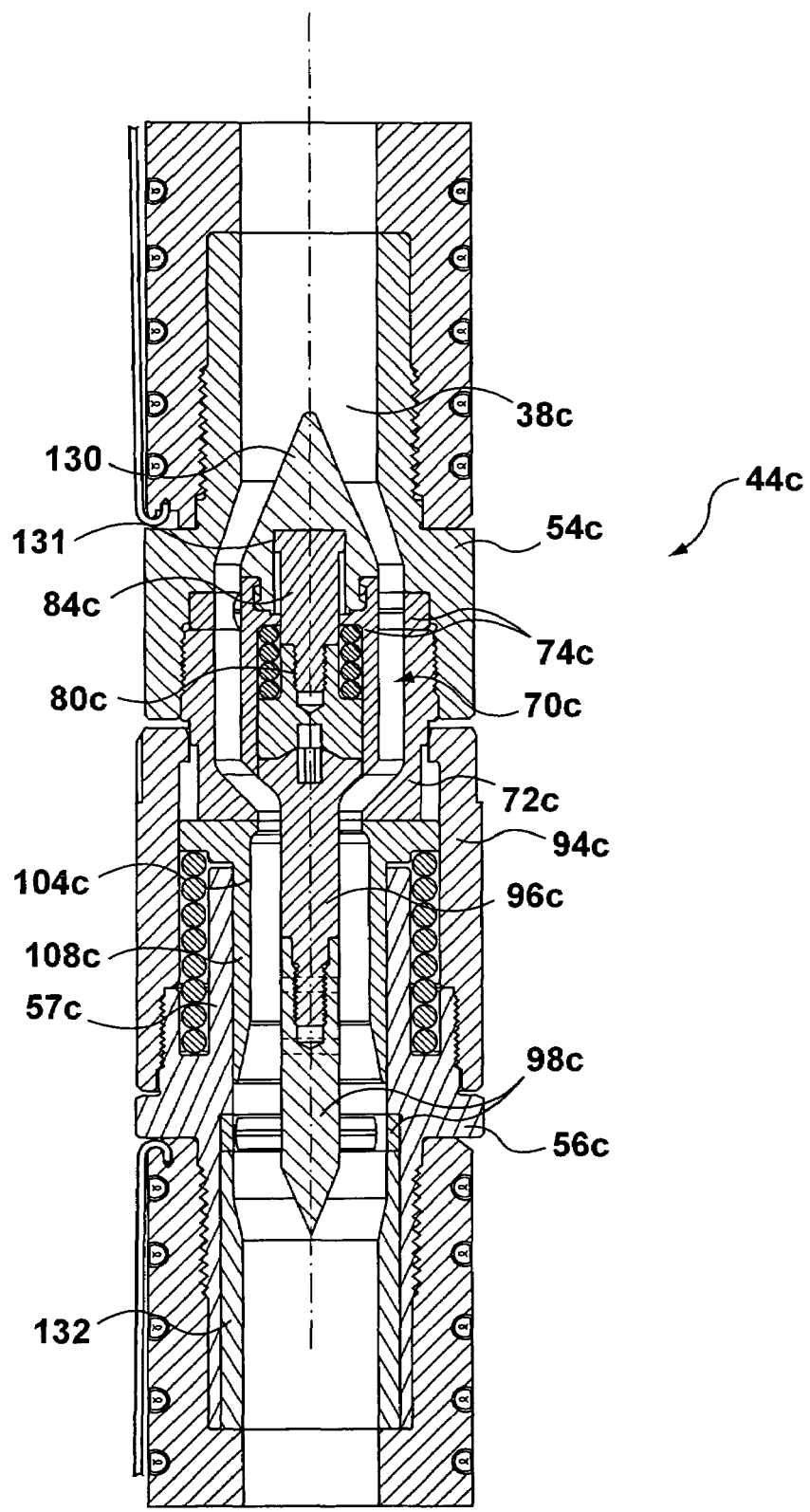

A further embodiment of the melt transfer device is illustrated in FIGS. 10 and 11 in the closed position and the engaged and open position, respectively. As in the previous embodiments, melt transfer device 44c generally includes first link 54c, second link 56c, movable pin assembly 70c, stationary sleeve 72c, movable sleeve assembly 94c, and stationary pin 96c.

Melt transfer device 44c includes a cap 130 that is coupled to base 74c of movable pin assembly 70c. Cap 130 is generally conical in shape and has a bore 131 that is configured to receive tip 84c of pin 80c as it reciprocates with movable pin 80c. In this configuration, tip 84c of pin 80c is enclosed within movable pin assembly 70c so that it is not exposed to melt within first melt channel 38c. Cap 130 may be removably coupled to base 74c, such as by threaded surfaces included on both cap 130 and base 74c.

In melt transfer device 44c, tapered portion 108c of movable sleeve 104c telescopes within an extended cylindrical portion 57c of second link 56c rather than the base of the stationary pin, as previously described in another embodiment.

Melt transfer device 44c also includes a retainer 132 for securing base 98c of stationary pin member 96c within second link 56c. Retainer 132 may be coupled to second link 56c such as by threaded surfaces included on both retainer 132 and second link 56c, by brazing retainer 132 to second link 56c or by compressing retainer 132 and base 98c between second link 56c and the transfer nozzle. It should be appreciated that the second link, the base of the stationary pin member and the corresponding transfer nozzle may be configured such that the retainer is not required.

Figure 14:
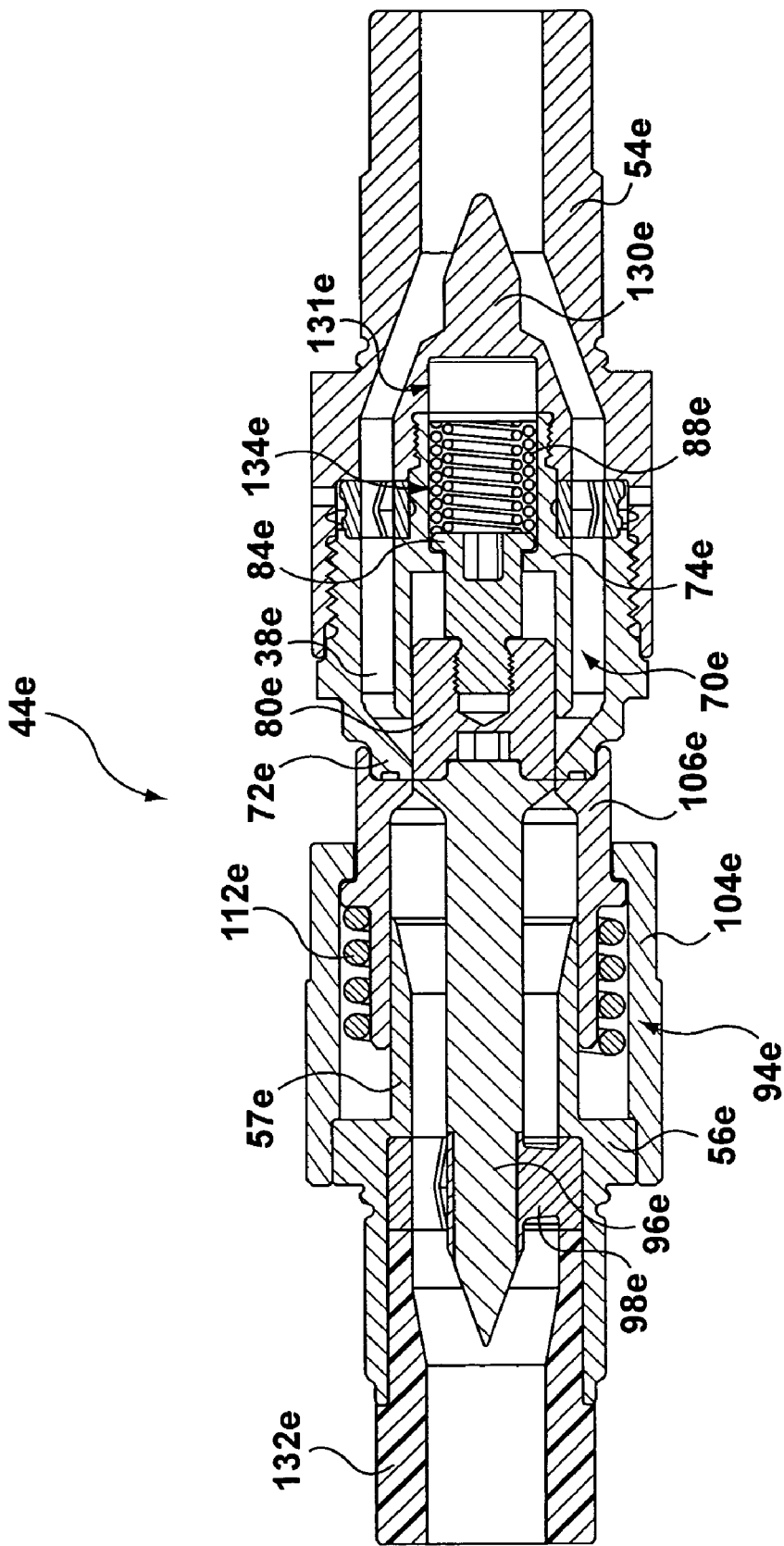
FIGS. 14 and 15 are side cross-sectional views of another embodiment of the melt transfer device according to the present invention in a closed position and in an engaged and open position, respectively.
Figure 15:
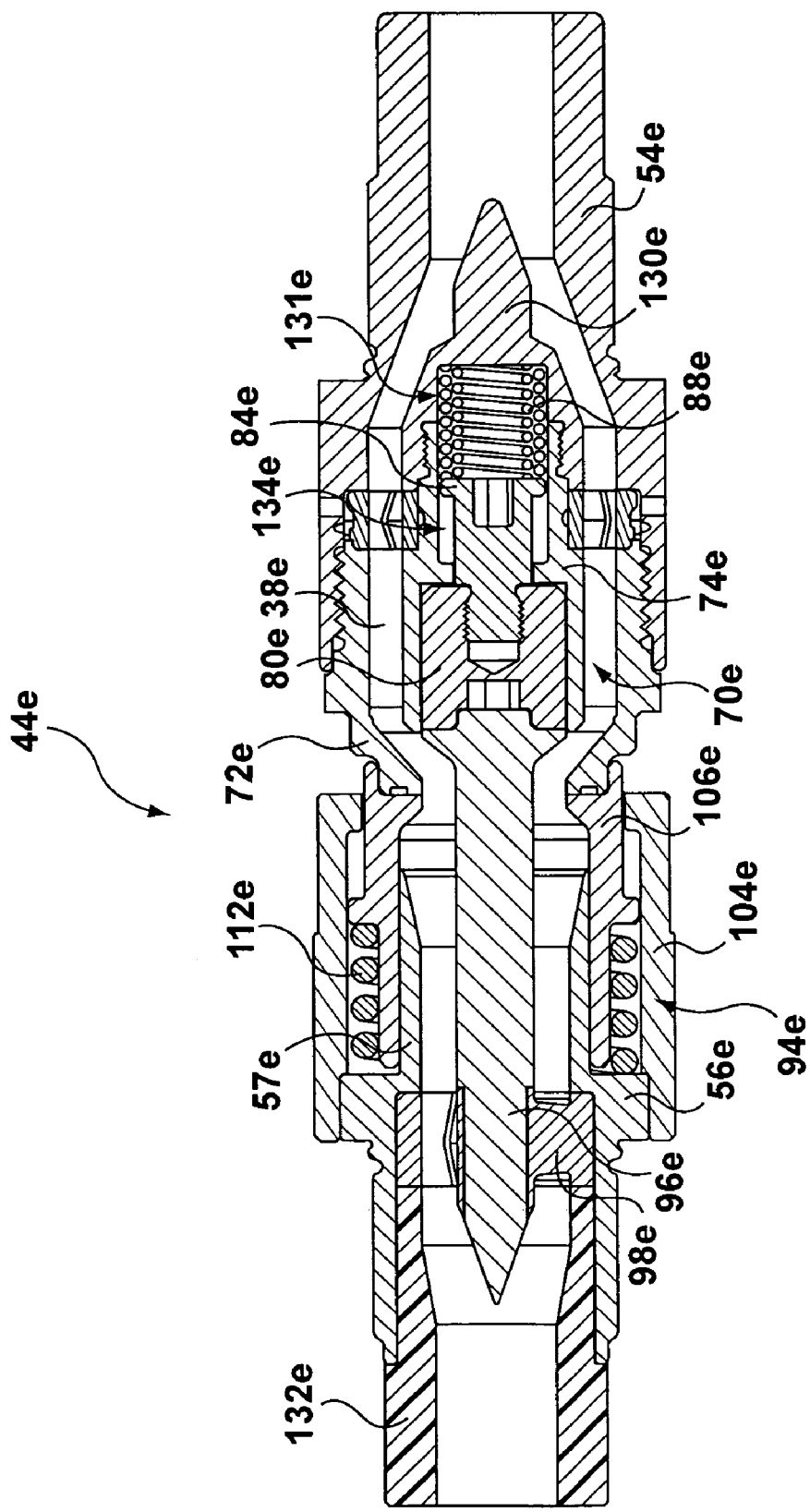

FIGS. 14 and 15 show another embodiment of the device. A melt transfer device 44e is shown in the closed position and the engaged and open position, respectively. As in the previous embodiments, melt transfer device 44e generally includes first link 54e, second link 56e, movable pin assembly 70e, stationary sleeve 72e, movable sleeve assembly 94e, and stationary pin 96e.

Melt transfer device 44e includes a cap 130e that is removably coupled to base 74e of movable pin assembly 70e. Unlike the previous embodiments, however, a portion of cap 130e is mounted to first link 54e. Cap 130e is generally conical in shape and has a bore 131e that is configured to receive a portion of a spring 88e, which may include multiple spring components as shown. Base 74e includes a bore 134e that receives a portion of spring 88e and a tip 84e of movable pin 80e. As pin 80e reciprocates within movable pin assembly 70e, tip 84e slides within bore 134e and compresses spring 88e. In this configuration, tip 84e of pin 80e and spring 88e are enclosed within movable pin assembly 70c so that they are not exposed to melt within first melt channel 38e. Base 74e may be removably coupled to cap 130e, such as by threaded surfaces included on both base 74e and cap 130e. Pin 80e may include multiple components that are assembled within base 74e, such as by threaded connections.

In melt transfer device 44e, a portion of movable sleeve 104e telescopes on an outer surface of extended cylindrical portion 57e of second link 56e. A spring 112e occupies a space provided between movable sleeve 104e, second link 56e and an outer collar 106e.

Melt transfer device 44e also includes a retainer 132e for securing a base 98e of a stationary pin member 96e within second link 56e. Retainer 132e may be coupled to second link 56e such as by threaded surfaces included on both retainer 132e and second link 56e, by brazing retainer 132e to second link 56e or by configuring the adjacent components such that retainer 132e and base 98e are compressed between second link 56e and the corresponding transfer nozzle.

It will be appreciated by persons skilled in the art that the first and second shut off valves 70, 94 may not operate simultaneously and may be configured so that the first shut off valve 70 closes prior to the second shut off valve 94, or vice versa.

It will also be appreciated that spring 88 and/or spring 112 in all of the embodiments described above may be any type of spring known in the art. Furthermore, it will be appreciated that where a single spring is shown, multiple springs may be included, as shown in FIGS. 14 and 15.

Figure 12:
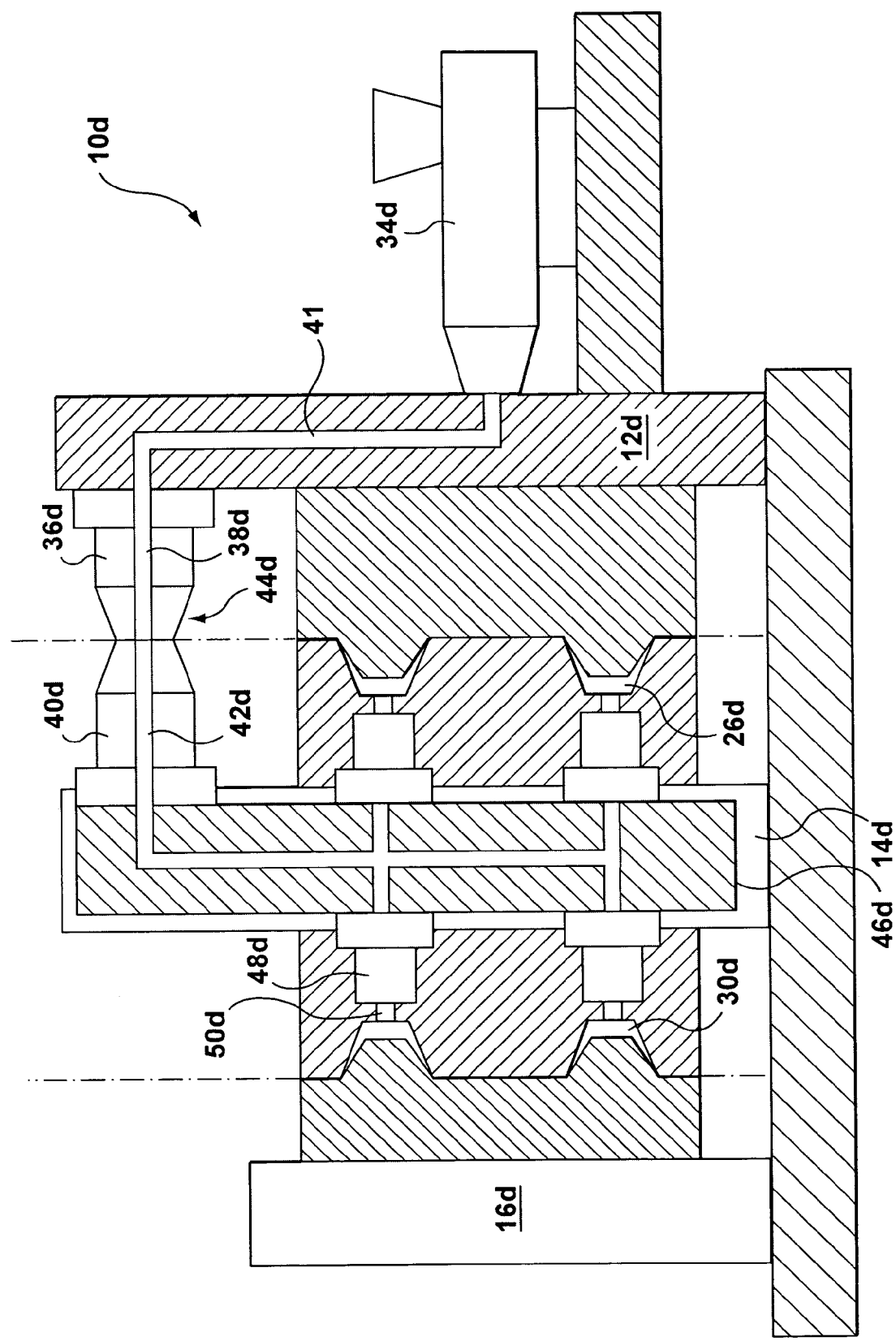
FIGS. 12 and 13 are schematic side views of a stack injection molding apparatus according to still another embodiment of the present invention.
Figure 13:
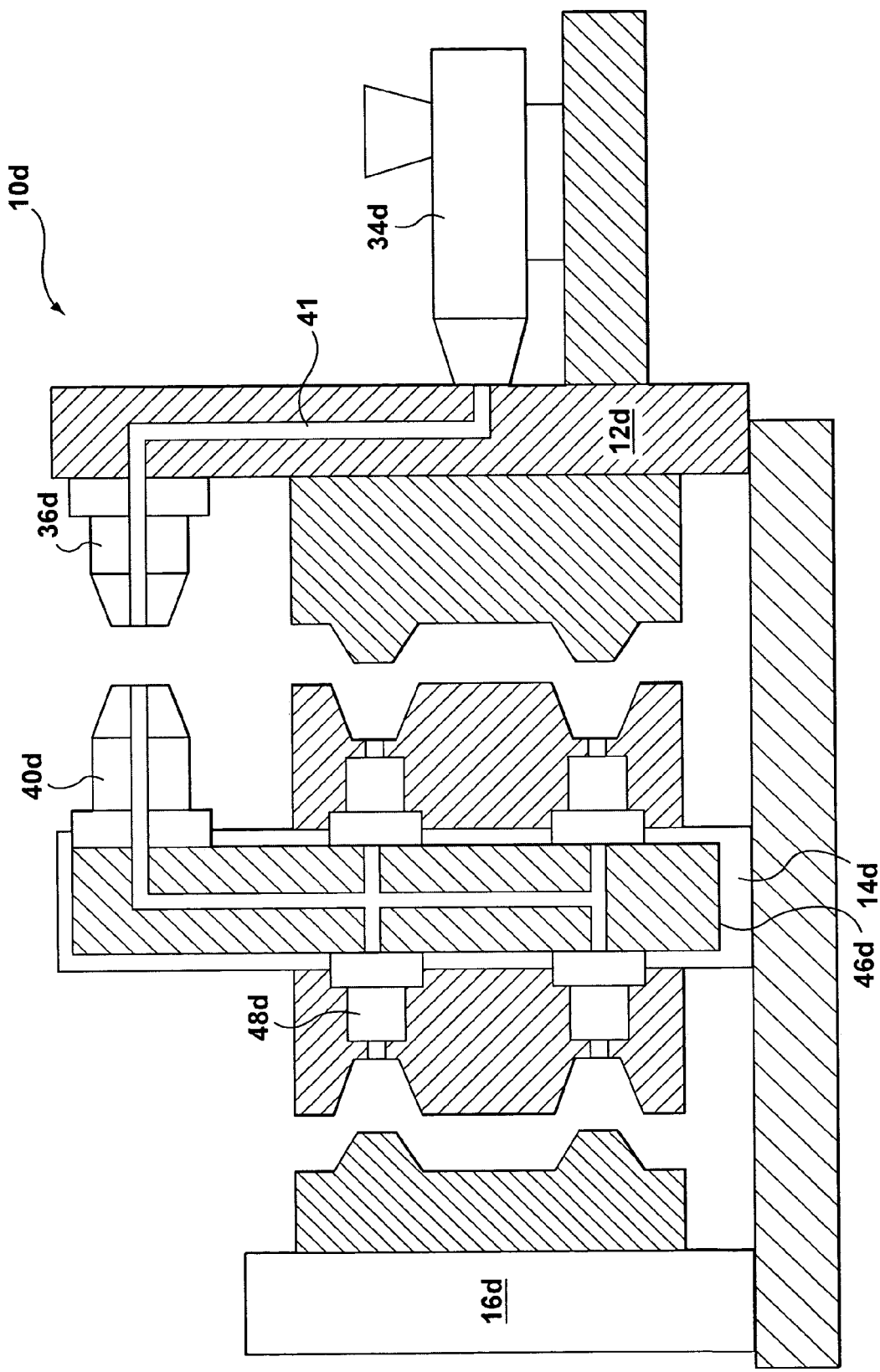

Referring to FIGS. 12 and 13, another embodiment of a stack injection molding apparatus 10d is generally shown. This embodiment is similar to the previous embodiments, however, melt transfer device 44d is offset from stationary first mold platen 12d, movable center mold platen 14d and movable second mold platen 16d. A melt channel 41 extends through stationary first mold platen 12d to allow melt to flow from machine nozzle 34d into melt transfer device 44d. From melt transfer device 44d, the melt flows through manifold 46d and into nozzles 48d, which deliver melt to mold cavities 26d and 30d through mold gates 50d.

Melt transfer device 44d includes first melt transfer nozzle 36d which has a first melt channel 38d and second melt transfer nozzle 40d which has a second melt channel 42d. Melt transfer device 44d is similar to the melt transfer device shown in the previous embodiments and therefore will not be further described.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A melt transfer device, comprising:
   a first shut off valve including a first melt channel, a first sleeve and a first pin located within the first sleeve, the first pin being movable with respect to the first sleeve, wherein the first pin is configured to slidably contact the first sleeve over a portion of the travel of the first pin thereby fluidly closing an end of the first melt channel; and
   a second shut off valve including a second melt channel, a second sleeve and a second pin located within the second sleeve, the second sleeve being movable with respect to the second pin wherein the second sleeve is configured to slidably contact the second pin over a portion of the travel of the second sleeve thereby fluidly closing an end of the second melt channel,
   wherein the first shut off valve is configured to engage the second shut off valve such that the first sleeve presses the second sleeve, and the second pin presses the first pin, thereby fluidly coupling the first melt channel to the second melt channel.

2. The melt transfer device according to claim 1, wherein the first sleeve presses the second sleeve at a sleeve interface and the second pin presses the first pin at a pin interface that is coplanar with the sleeve interface.

3. The melt transfer device according to claim 1, wherein the first pin is spring-loaded by at least one pin spring.

4. The melt transfer device according to claim 3, wherein the second sleeve is spring-loaded by at least one sleeve spring.

5. The melt transfer device according to claim 3, wherein the at least one pin spring is fluidly isolated from the first melt channel.

6. The melt transfer device according to claim 4, wherein the at least one pin spring is fluidly isolated from the first melt channel and the at least one sleeve spring is fluidly isolated from the second melt channel.

7. The melt transfer device according to claim 1, wherein the first melt channel includes an annular portion and the second melt channel includes an annular portion and the first shut off valve and the second shut off valve are configured such that the annular portion of the first melt channel couples to the annular portion of the second melt channel.

8. The melt transfer device according to claim 1, wherein a portion of the first melt channel is defined between an inner surface of the first sleeve and an outer surface of the first pin.

9. The melt transfer device according to claim 1, wherein a portion of the second melt channel is defined between an inner surface of the second sleeve and an outer surface of the second pin.

10. A melt transfer device, comprising:
    a first shut off valve including a first melt channel, a first stationary portion and a first movable portion movable with respect to the first stationary portion, wherein the first shut off valve is in a closed position when the first movable portion is extended such that it slidably contacts the first stationary portion thereby closing an end of the first melt channel; and
    a second shut off valve including a second melt channel, a second stationary portion and a second movable portion movable with respect to the second stationary portion, wherein the second shut off valve is in a closed position when the second movable portion is extended such that it slidably contacts the second stationary portion thereby closing an end of the second melt channel;
    wherein the first shut off valve is configured to engage the second shut off valve such that the first stationary portion forces the second movable portion to retract and the second stationary portion forces the first movable portion to retract such that the first shut off valve is in an open position and the second shut off valve is in an open position wherein the first melt channel and the second melt channel are in fluid communication with each other,
    wherein a portion of a first melt channel is defined between a surface of the first stationary portion and a surface of the first movable portion and a portion of a second melt channel is defined between a surface of the second stationary portion and a surface of the second movable portion when the first shut off valve is in an open position and the second shut off valve is in an open position.

11. The melt transfer device according to claim 10, wherein the first movable portion is spring-loaded.

12. The melt transfer device according to claim 10, wherein the second movable portion is spring-loaded.

13. A stack molding apparatus, comprising:
a stationary platen including a first melt channel in fluid communication with a source of molten material;
a first movable platen including a second melt channel fluidly coupled to a manifold that is in fluid communication with a plurality of mold cavities;
a second movable platen, wherein a first portion of the plurality of mold cavities is defined between the stationary platen and the first movable platen and a second portion of the plurality of mold cavities is defined between the first movable platen and the second movable platen; and
a melt transfer device including a first shut off valve that is in fluid communication with the first melt channel and a second shut off valve that is in fluid communication with the second melt channel, wherein the first shut off valve includes a stationary sleeve and a movable first pin, wherein the movable pin slidably contacts the stationary sleeve to close an end of the first melt channel when the first shut off valve is in a closed position and the movable first pin is separated from the stationary sleeve by a gap when the first shut off valve is in an open position, wherein the second shut off valve includes a movable sleeve and a second pin, wherein the movable sleeve is movable with respect to the second pin and slidably contacts the second pin to close an end of the second melt channel when the second shut off valve is in a closed position and the movable sleeve is separated from the second pin when the second shut off valve is in an open position, and
wherein the first shut off valve and the second shut off valve are configured such that they abut immediately adjacent to the respective closed ends of the first and second melt channels and are opened by movement of the first movable platen toward the stationary platen.

14. The stack molding apparatus according to claim 13, wherein the movable first pin is spring-loaded and the movable sleeve is spring-loaded.

15. The stack molding apparatus according to claim 14, wherein the spring-loaded first pin includes multiple springs.

16. The stack molding apparatus according to claim 14, wherein the spring-loaded sleeve includes multiple springs.

17. The stack molding apparatus according to claim 14, wherein the spring-loaded sleeve contacts the stationary sleeve at a sleeve interface and the spring-loaded first pin contacts the second pin at a pin interface that is coplanar with the sleeve interface when the first shut off valve and the second shut off valve are engaged and closed.

18. A method for transferring melt from a stationary mold platen to a movable mold platen in a stack molding apparatus, comprising the steps of:
providing a stationary mold platen, a first shut off valve coupled to the stationary mold platen, at least one movable mold platen, and a second shut off valve coupled to the at least one movable mold platen, wherein the first shut off valve is in a closed position such that a first pin is in sliding contact with a first sleeve thereby closing a first melt channel and the second shut off valve is in a closed position such that a second pin is in sliding contact with a second sleeve thereby closing a second melt channel;
moving the at least one movable mold platen toward the stationary platen to a first position, wherein when the movable mold platen is in the first position the first shut off valve and the second shut-off valve engage each other such that the first sleeve of the first shut-off valve contacts the second sleeve of the second shut off valve and the first pin of the first shut off valve contacts the second pin of the second shut off valve;
moving the at least one movable mold platen further toward the stationary platen to a second position such that the first sleeve forces the second sleeve to move with respect to the second pin and the second pin forces the first pin to move with respect to the first sleeve thereby removing sliding contact between the first pin and the first sleeve and removing contact between the second pin and the second sleeve, wherein when the movable mold platen is in the second position the first melt channel is fluidly coupled to the second melt channel.

19. The method for transferring melt according to claim 18, wherein an annular portion of the first melt channel is coupled to an annular portion of the second melt channel.

20. The method for transferring melt according to claim 18, wherein the first pin is spring-loaded and the second sleeve is spring-loaded.

* * * * *